No. 853,315.

PATENTED MAY 14, 1907.

F. NEVILLE.
INSECT TRAP.
APPLICATION FILED DEC. 15, 1906.

2 SHEETS—SHEET 1.

Witnesses
B. M. Offutt
G. M. Spring

Inventor
Frank Neville
By E. E. Vrooman,
his Attorney.

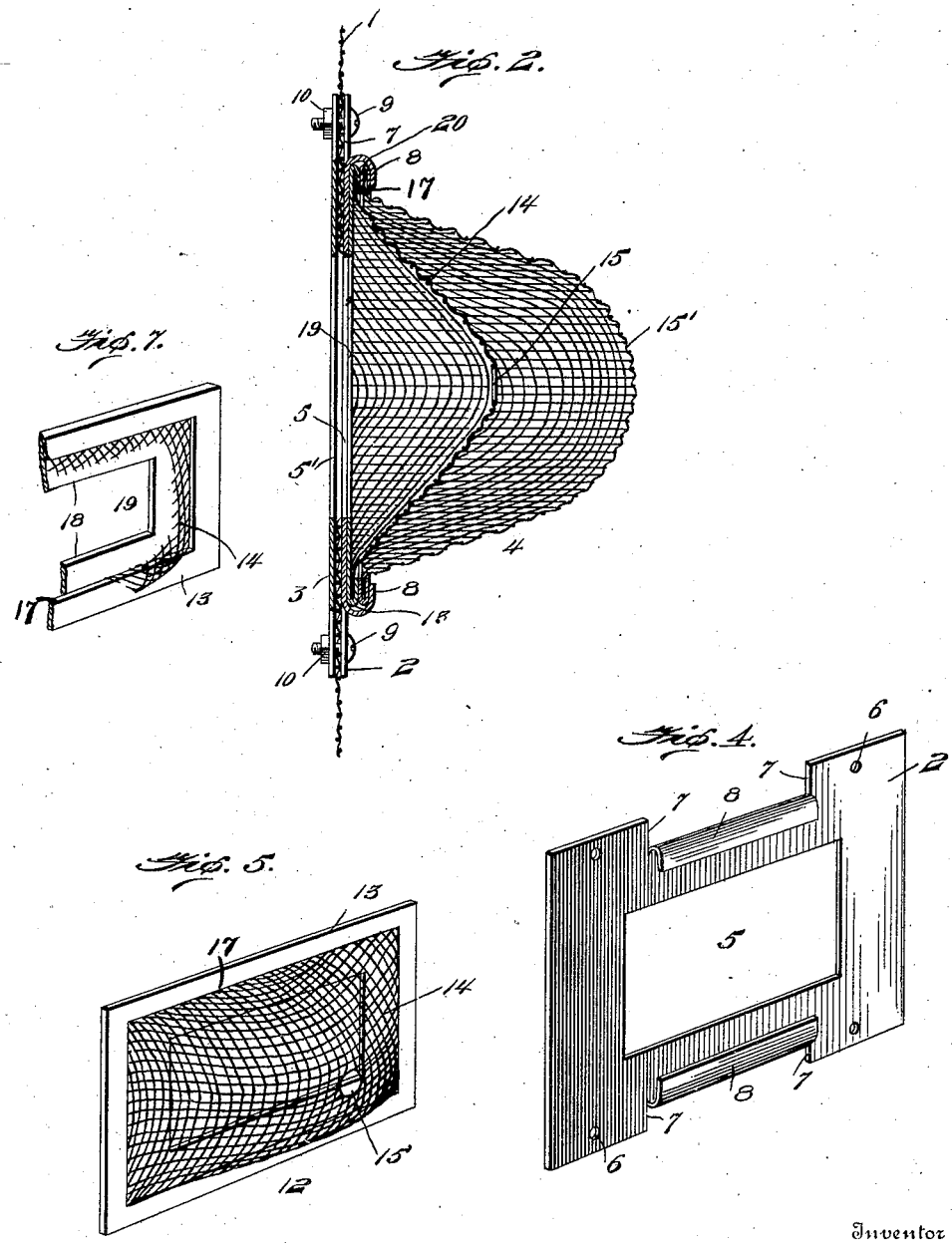

UNITED STATES PATENT OFFICE.

FRANK NEVILLE, OF MINA, NEVADA.

INSECT-TRAP.

No. 853,315.        Specification of Letters Patent.        Patented May 14, 1907.

Application filed December 15, 1906. Serial No. 348,007.

*To all whom it may concern:*

Be it known that I, FRANK NEVILLE, a citizen of the United States, residing at Mina, in the county of Esmeralda and State of Nevada, have invented certain new and useful Improvements in Insect-Traps, of which the following is a specification, reference being had therein to the accompanying drawing.

This invention relates to improvements in insect traps, and particularly to a trap for catching flies.

The object of the invention is the improvement of the construction of an insect trap, which may be attached to a door or window screen, or any other suitable support.

Another object of the invention is the provision of means for facilitating the catching of flies or other insects.

With these and other objects in view, the invention consists of certain novel constructions, combinations, and arrangements of parts, as will be hereinafter fully described and claimed.

Figure 1:
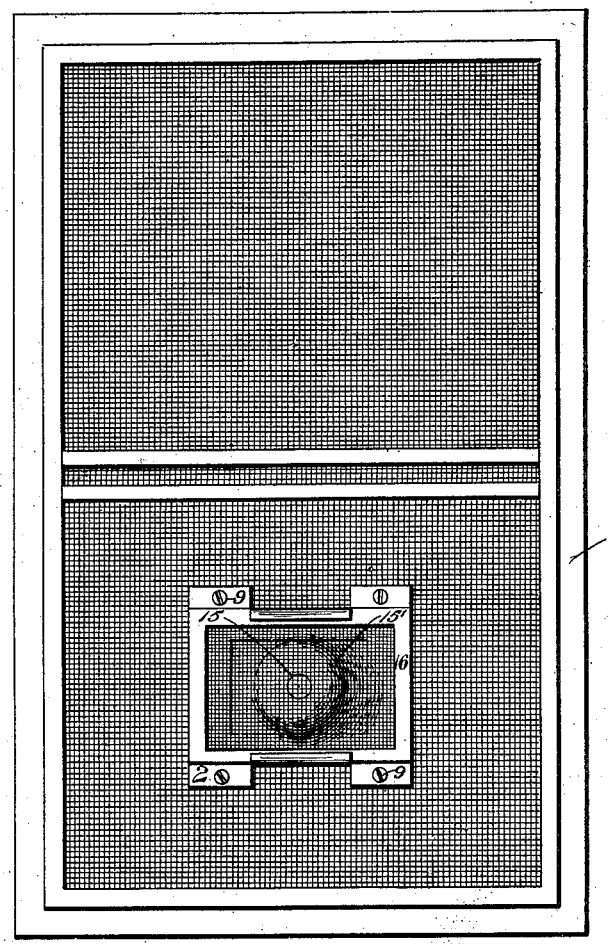
Figure 3:
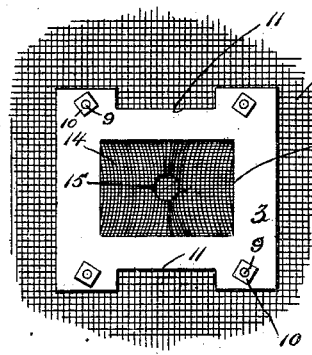
Figure 6:
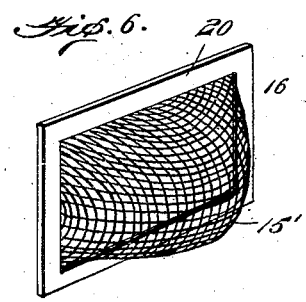

In the drawings: Figure 1 is a view in side elevation of a trap constructed in accordance with the present invention, showing the same secured to preferably a door-screen. Fig. 2 is a central, vertical, sectional view of the trap depicted in Fig. 1. Fig. 3 is a view in elevation of the front of the trap depicted in Fig. 1. Fig. 4 is a perspective view of the primary plate or member of the trap. Fig. 5 is a perspective view of the primary section of the cage. Fig. 6 is a perspective view of the auxiliary section of the cage. Fig. 7 is a fragmentary, perspective view of the primary section of the cage.

Referring to the drawings by reference numerals, 1 designates a door-screen, constituting a support for my insect trap. I have shown this door-screen 1 as the support for my insect trap, for the purpose of showing the same applied in an operative position upon a support.

The trap comprises a primary plate or member 2, an auxiliary plate 3, and a cage 4 carried by said plates, as hereinafter described. The primary plate 2 is preferably elongated, and is provided with a central opening or aperture 5, which aperture is illustrated in the drawings oblong shape. The plate 2 is provided, preferably near each corner thereof, with an aperture 6. The plate is cut at 7, 7 upon the sides, and the cut portion 8 is bent over substantially parallel with the plate 2. The inner edges of these bent portions 8 extend toward each other, and constitute longitudinally extending brackets upon plate 2. Hereafter, I will refer to these cut portions 8 as brackets for supporting the cage 4 of the trap. The auxiliary plate or member 3, Fig. 3, is provided with an opening or an aperture 5', preferably similar in structure to the aperture 5 of the primary plate or member. The plate 3 is provided with apertures similarly positioned to the apertures 6 of plate 2, so that the apertures of plate 3 and plate 2 will register when said plates are positioned together, and if a support, as for instance, screen 1, is positioned between these plates, and suitable fastening means, as for instance, bolts 9, are positioned within these registering apertures of the primary and auxiliary plates 2 and 3, respectively, and the nuts 10 threaded upon said bolts 9, the primary and auxiliary plates will be secured upon the support 1. The support 1 is preferably provided with an opening or aperture of the same shape or dimension as the apertures 5 and 5' of the primary plate 2 and auxiliary plate 3, respectively, which apertures of the support 1 register with said apertures of said plates, when the plates are secured to the support or screen 1. The auxiliary plate 3 is preferably cut away, at 11, upon each side, so that the weight of said plate will be decreased, and also the shape of said plate conformed to the shape of the primary plate 2. By means of positioning the fastening means 9 and 10 near the corners of the primary and auxiliary plates 2 and 3, respectively, the plates are rigidly secured to the support or screen 1, although said plates can be readily detached from the support by quickly removing the fastening means 9 and 10 from said plates.

The primary section 12 of the cage, Fig. 5, comprises a base 13, to which is secured the screen-wire 14, having preferably a central aperture 15, through which aperture the insects pass into the compartment formed between the screen 14 and the screen 15' of the auxiliary section 16. The base 13 of the primary section is provided with an upper flange 17 and with a lower flange 18. The flanges 17 and 18 are integral, as the base 13 is preferably cast in a single integral piece. The wire-screen 14 is secured between the flanges 17 and 18, and is bent upwardly in the shape of preferably a cone, and engages the inner edge of the flange 17. Upon referring particularly to Figs. 2 and 7, it will be seen that the primary flange 18 is of greater width than the auxiliary flange 17, thereby forming a guard projecting a considerable distance beyond the auxiliary flange 17, which guard, constituted by the primary flange 18, will tend to prevent the insects from escaping after they have crawled down the outside of the wire-screen 14. If the flange 18 was not of greater width than the flange 17, the insects would often crawl down the outside of the wire-screen 14, and readily escape through the central opening 19 of the primary sections of the cage and the openings 5 and 5' of the primary and auxiliary plates 2 and 3, respectively. By the peculiar structure of the overhanging primary flange 18 of the base 13 of the primary section of the cage, the path of the insect crawling down the outside of the wire-screen 14 is somewhat obstructed which invariably causes the insects to turn and crawl up the outside of the wire-screen 14, and, consequently, directs them to the central opening 15, arranged preferably at the apex of the cone-shaped, primary section of the cage 4. The peculiarly constructed flange or guard 18 of the preferably cone-shaped, primary section 12 of the cage 4, greatly increases the efficiency of the trap, because, after an insect has come in contact with the outside of the wire-screen 14, it invariably finds the opening 15 and passes into the compartment formed between the primary and auxiliary sections of the cage.

The auxiliary section 16 of the cage 4, Fig. 6, comprises a base 20, the sides and ends of which are preferably U-shaped in cross-section, see Fig. 2, and between the U-shaped or overhanging portions of the base 20, is secured the wire-screen 15'.

When it is desired to assemble the parts of the trap, and place them on a suitable support, the auxiliary plate or member 3 is placed against one side of the support, and the primary plate or member 2 is placed upon the opposite side; the apertures 6 of the primary plate are caused to register with the similarly constructed apertures of the auxiliary plate 3, and then the fastening means 9 are positioned within these registering apertures for securing said plates to the support. The support 1 is either formed with an inlet aperture registering with the apertures of said plates, before said plates are secured to the support or after the same are secured thereto. The wire-screen 14 of the primary section of the cage is positioned within the auxiliary section 16, and the bases 13 and 20 of the sections 12 and 16 are held together and then the cage is slid or moved longitudinally upon the primary plate or member 2, between said plate and brackets 8. From practical experience, I found that the cage can be quickly positioned upon or removed longitudinally off of plate 2, at either of its ends. The brackets 8 not only support the cage 4 upon plate 2, but also constitute fastening means for holding the detachable sections of the cage 4 together. The cage can be readily slid off of the brackets, and moved apart when it is desired to clean each section or remove the insects in the trap. After the trap has been cleaned, the sections can be quickly brought together and positioned upon the plate 2.

It is to be noted that each of the brackets 8 is preferably curved transversely of its width, and has each end open so that the cage can be positioned upon the brackets or removed off of the same at either end.

What I claim is:

1. In an insect trap, the combination of a plate, longitudinally extending brackets formed upon opposite portions of said plate, and a removable, sectional cage supported between said brackets and plate.

2. In an insect trap, the combination of a plate, cut away portions formed upon said plate, said cut away portions bent over and extending toward each other, the cut away portions constituting brackets, and a slidable cage supported between said plate and brackets.

3. In an insect trap, the combination of a plate, longitudinally extending brackets formed upon said plate, and a longitudinally movable cage supported between said brackets and plate.

4. In an insect trap, the combination with a support, of parallel brackets carried by said support, a sectional trap positioned between said brackets, and said brackets constituting fastening means for holding the sections of said trap together.

5. In an insect trap, the combination with a support, of a sectional trap positioned contiguous to said support, and brackets carried by and supporting said cage upon said support and holding the sections together.

6. In an insect trap, the combination with a support, of a sectional cage positioned contiguous to said support, and brackets positioned at opposite sides of and supporting said cage upon the support and securing the sections thereof together.

7. In an insect trap, the combination with a support, of a primary plate positioned upon one side of said support, an auxiliary plate positioned upon the opposite side of said support, a series of fastening means positioned contiguous to the corners of said plates and securing the same upon said support, and a cage in engagement with one of said plates.

8. In an insect trap, the combination with a support, of plates positioned upon opposite sides of said support and in engagement therewith, transverse fastening means positioned near each corner of said plates and securing the same upon said support, and a cage carried by said plates.

9. In an insect trap, the combination with a support, of a cage carried by said support, said cage comprising a primary and an auxiliary section, the primary section comprising a base, said base comprising a primary and an auxiliary flange, the primary flange of greater width than the auxiliary flange, a wire-screen secured between said flanges, said primary flange overhanging the lower end of the wire-screen, and constituting a guard.

10. In an insect trap, the combination with a support, of a sectional cage carried by said support, one of said sections of said cage provided with a base, said base comprising a primary and an auxiliary flange, the primary flange of greater width than the auxiliary flange, said primary flange constituting a guard for the lower end of the section, for obstructing the path of an insect, in engagement with the outside of said section.

11. In an insect trap, the combination with a support, of a primary and an auxiliary plate positioned upon opposite sides of said support, fastening means extending through said plates and positioned contiguous to their corners, a sectional cage in engagement with one of said plates, and fastening means positioned at opposite sides of the cage and between each two fastening means for securing the cage upon said plates and securing its sections together.

12. In an insect trap, the combination with a support, of a sectional cage slidably mounted upon said support, and brackets supporting said cage upon said support and securing its sections together, the cage adapted to be moved longitudinally off of one end of said brackets.

In testimony whereof I hereunto affix my signature in presence of two witnesses.

FRANK NEVILLE.

Witnesses:
  E. R. RAY,
  T. MURPHY.